United States Patent

Yang

[11] Patent Number: 5,274,478
[45] Date of Patent: Dec. 28, 1993

[54] DISPLAYER WITH HOLOGRAMS

[75] Inventor: Keun Y. Yang, Seoul, Rep. of Korea

[73] Assignee: Goldstar Co., Ltd., Rep. of Korea

[21] Appl. No.: 753,033

[22] Filed: Aug. 30, 1991

[30] Foreign Application Priority Data

Aug. 31, 1990 [KR] Rep. of Korea ............... 13826/1990

[51] Int. Cl.⁵ ........................... G02B 5/32; G03H 1/26
[52] U.S. Cl. ......................................... 359/15; 359/19; 359/22; 359/33
[58] Field of Search ....................... 359/13, 14, 15, 16, 359/19, 24, 32, 33, 22

[56] References Cited

U.S. PATENT DOCUMENTS

| | | | |
|---|---|---|---|
| 3,975,080 | 8/1976 | Norman | 359/33 |
| 4,130,337 | 12/1978 | Okoshi | 359/33 |
| 4,309,070 | 1/1982 | St. Leger Searle | 359/15 |
| 4,329,019 | 5/1982 | Okoshi et al. | 359/19 |
| 4,573,759 | 3/1986 | Swift | 359/32 |
| 4,613,200 | 9/1986 | Hartman | 359/13 |
| 4,669,810 | 6/1987 | Wood | 359/19 |
| 4,730,912 | 3/1988 | Loy et al. | 359/16 |
| 4,832,427 | 5/1989 | Nanba et al. | 359/24 |
| 4,896,929 | 1/1990 | Haas et al. | 359/32 |
| 4,981,332 | 1/1991 | Smith | 359/16 |
| 5,035,473 | 7/1991 | Kuwayama et al. | 359/13 |
| 5,037,166 | 8/1991 | Malcolm et al. | 359/33 |

FOREIGN PATENT DOCUMENTS

| | | | |
|---|---|---|---|
| 2-179604 | 7/1990 | Japan | 359/16 |
| 2-308120 | 12/1990 | Japan | 359/15 |

*Primary Examiner*—Martin Lerner
*Attorney, Agent, or Firm*—Ostrolenk, Faber, Gerb, & Soffen

[57] ABSTRACT

A displayer for use in a computer comprising a main body, a CRT mounted in the main body and generating an image in an electromagnetic beam, a pair of holograms for projecting the image from the CRT, the holograms mounted in the main body, and a screen for displaying the image projected by the holograms thereon, the screen mounted at a position at which the image is last projected by the holograms. The present invention provides a displayer which provides advantages in that the harmful electromagnetic waves generated from the CRT does not affect the operator by virtue of the holograms, and a screen of a desired large size is obtained at lower cost.

4 Claims, 2 Drawing Sheets

DISPLAYER WITH HOLOGRAMS

BACKGROUND OF THE INVENTION

The present invention relates to a displayer for use in a computer, and more particularly to a displayer which is provided with holograms for projecting data image generated by a CRT equipped in the main body of the computer and displays the image on a magnifying screen thereof.

Conventionally, display means such as a CRT display is a device for displaying data, outputted from a CPU (central processing unit), on the fluorescent screen thereof by means of electron beam, thereby providing visible data in characters or graphics for the operator. The displayer generally comprises a main body enclosing control units, a keyboard as an input unit and a fluorescent screen for displaying the image thereon in order to allow the operator to see the image.

Known displayer is generally provided with a CRT (Cathode Ray Tube), an EL (Electroluminescence) display device or an LCD (Liquid Crystal Display) device in order to receive data from the CPU and generate a data image which is to be displayed on the screen.

However, the known displayers have disadvantages in that the CRT display provided with the CRT generates harmful electromagnetic waves which affect the operator in case of operation for a long time so that an optical defect and a headache may occur, while the LCD display provided with the LCD, even tough this type of display has no drawback of generation of such electromagnetic waves, causes the manufacturing cost to be considerably higher in proportion to the size of the screen and also a limitation in the size of the screen due to the manufacturing difficulty thereof.

SUMMARY OF THE INVENTION

It is, therefore, an object of the present invention to provide a displayer for use in a computer in which the above disadvantages are overcome and which is provided with reflective holograms, displays data image, generated from a small CRT equipped in the main body thereof, on a magnifying screen by way of the holograms, thereby causing the harmful electromagnetic waves from the CRT not to affect the operator.

It is another object of the present invention to provide a displayer which is capable of magnifying an image from a small-sized CRT by holograms instead of using a large-sized CRT, thus making it possible to reduce the cost of the product.

In one aspect, the above-mentioned objects of the present invention can be accomplished by providing a displayer comprising: a main body, a CRT mounted in said main body and generating an image in an electromagnetic beam, a pair of holograms for projecting said image from said CRT, said holograms mounted in said body, and a screen for displaying said image projected by said holograms thereon, said screen mounted at a position at which said image is last projected by said holograms.

In the above displayer in accordance with this invention, the first hologram is a reflective type hologram manufactured such that a spherical wave $W_1$ as the reference beam is radiated from a spherical wave scanning point $P_1$ to the center point of a hologram plate at an angle of incidence $\theta$, a condensed spherical wave $W_2$ as the object beam is condensed at a beam condensing point $P_2$ so that an angle of incidence of said condensed spherical wave $W_2$ to said hologram plate is set as $\theta$, a distance $l_1$ from said spherical wave scanning point $P_1$ to said hologram plate is equal to $L_1$, and also a distance $l_2$ from said hologram plate to said beam condensing point $P_2$ is equal to $L_2+L_3$, wherein, $L_1$ = a distance from said CRT to said first hologram,
$L_2$ = a between said first and second holograms,
$L_3$ = a distance from said second hologram to an image first product by said first hologram.

Also, the second hologram is a reflective type hologram manufactured such that a condensed spherical wave $W_3$ as the reference beam is condensed at a beam condensing point $P_3$ so that an angle of incidence of said condensed spherical wave $W_3$ to a hologram plate is set as $\theta$, a condensed spherical wave $W_4$ as the object beam is condensed at a beam condensing point $P_4$ so that an angle of incidence of said condensed spherical wave $W_4$ to said hologram plate is set as $\theta$, and a distance $l_3$ from said beam condensing point $P_3$ to said hologram plate is equal to $L_3$, and also a distance $l_4$ from said hologram plate to said beam condensing point $P_4$ is equal to $L_4$.

wherein, $L_3$ = a distance from said second hologram to an image first produced by said first hologram.
$L_4$ = a distance from said second hologram to an image second produced by said second hologram.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
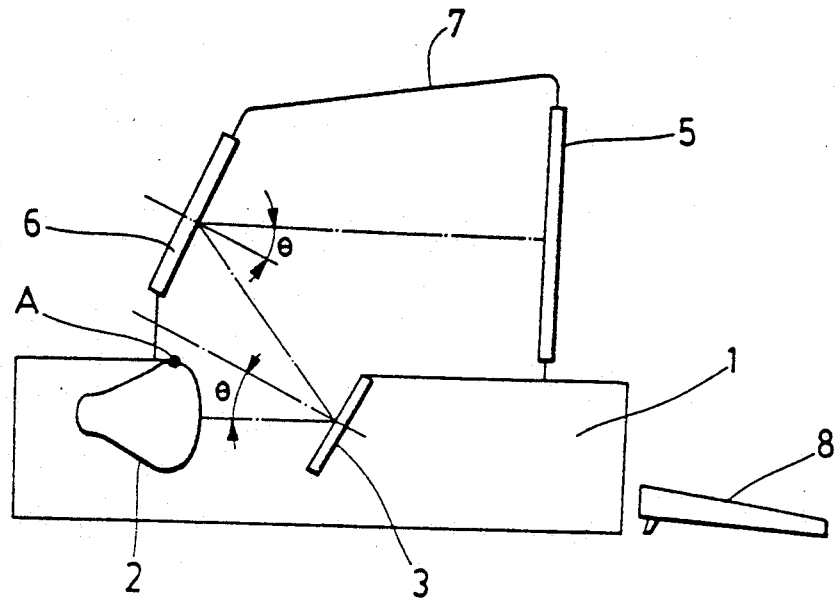
FIG. 1 is a schematic view representing the construction of a displayer provided with holograms in accordance with the present invention.

Referring now to FIG. 1 with a schematic view representing the construction of a displayer provided with holograms in accordance with the present invention, the displayer comprises a small cathode ray tube 2 (hereinafter, referred to simply as "the CRT") mounted in the rear inside portion of a main body 1 of a computer, a first hologram 3 arranged inside the main body 1 before the CRT 2 at an inclination angle in order to first project the image having generated from the CRT 2, a second hologram 6 arranged over the first hologram 3 in order to face therewith in parallelism and be spaced therefrom and adapted to second project the image having first projected by the first hologram 3 and display the image on a magnifying screen 5. Also, the displayer further comprises a casing 7 for shielding the inside thereof from the outside light and protecting the enclosures from the outside shock, and a keyboard 8 as an input unit.

Figure 2:
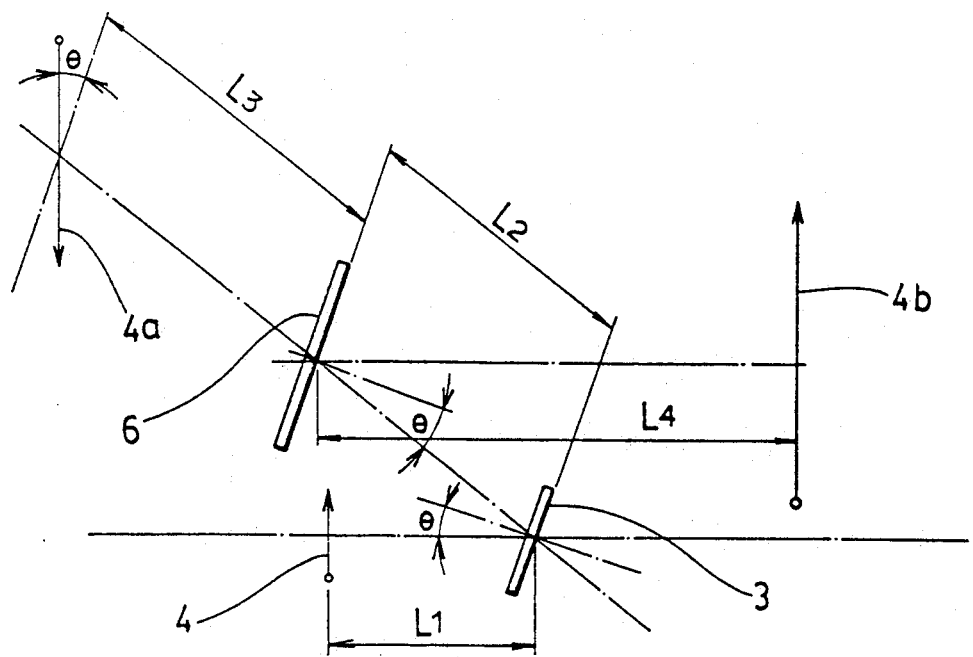
FIG. 2 is a view representing the image projection by the holograms, a first hologram and a second hologram of the displayer of FIG. 1.

Here, the above-mentioned elements of the displayer are arranged such that the distance from the CRT 2 to the first hologram 3 is a distance $L_1$, the distance between the first and second holograms 3 and 6 is a distance $L_2$ and the distance form the second hologram 6 to the enlarging screen 5 is a distance $L_4$, as shown in FIG. 2.

Figure 3:
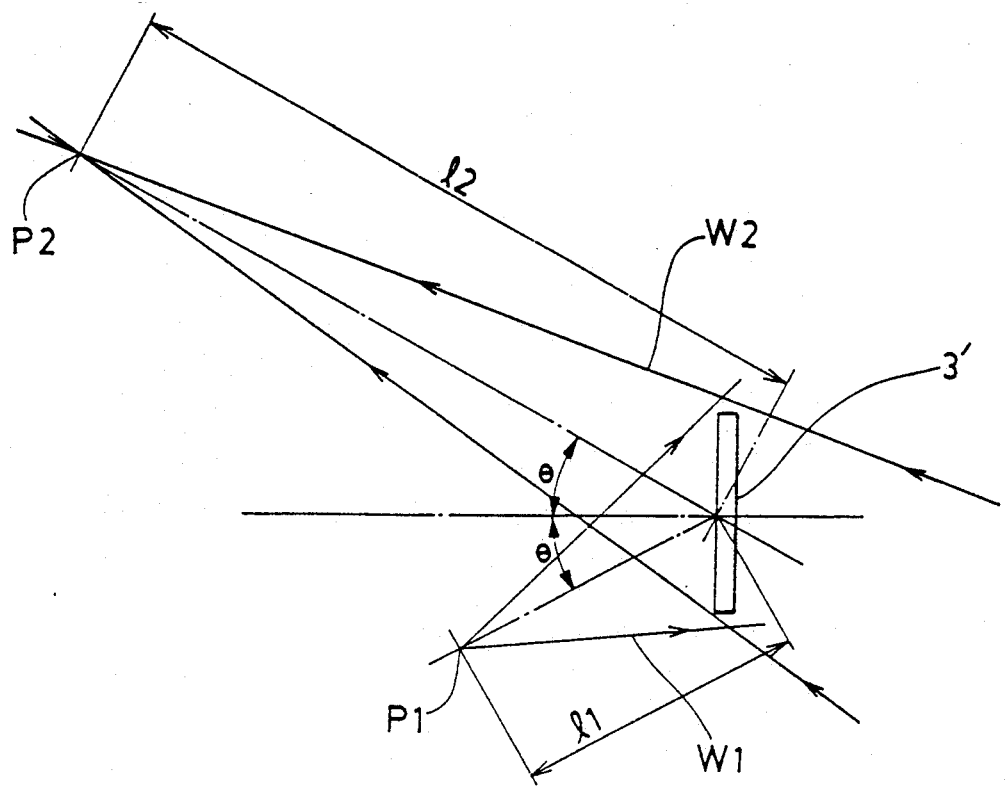
FIG. 3 is a view illustrating the principle for manufacturing the first hologram of FIG. 2.

Turning next to FIG. 3 which is a view illustrating the principle for manufacturing the first hologram 3, the first hologram 3 is a reflective hologram manufactured such that a spherical wave $W_1$ as the reference beam is radiated from the spherical wave scanning point $P_1$ to the center point of a hologram plate 3' at an angle of incidence $\theta$, and a condensed spherical wave $W_2$ as the object beam is condensed at a beam condensing point $P_2$ so that an angle of incidence of the $W_2$ to the hologram plate 3' is set as $\theta$, and a distance $I_1$ from the scanning point $P_1$ to the hologram plate 3' is equal to the distance $L_1$, and also the distance $I_2$ from the hologram plate 3' to the condensing point $P_2$ is equal to a sum total of the distances $L_2$ and $L_3$, that is $L_2+L_3$ as shown in FIG. 2.

Figure 4:
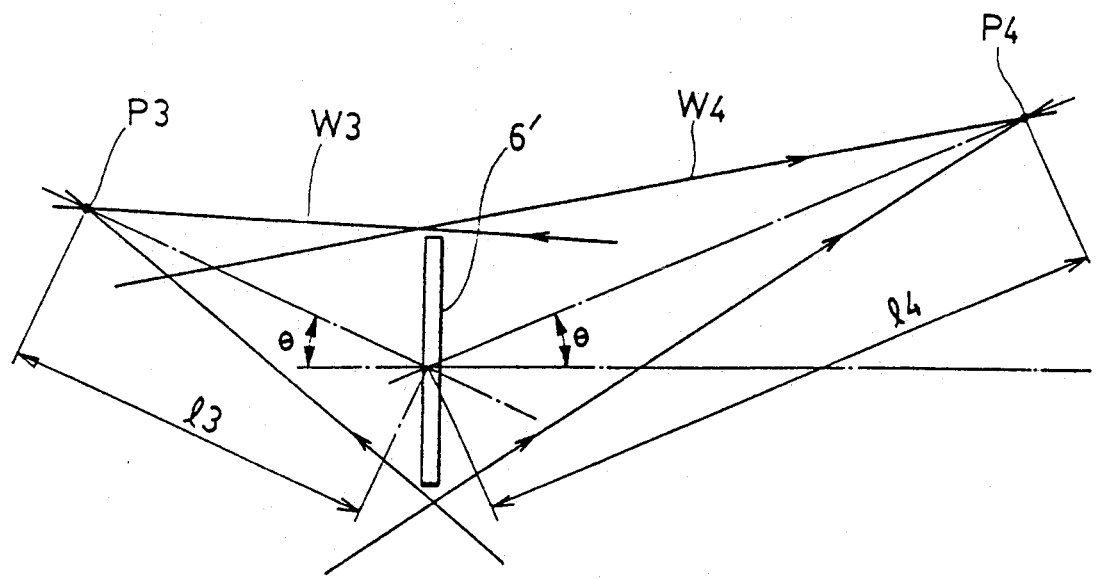
FIG. 4 is a view illustrating the principle for manufacturing the second hologram of FIG. 2.

FIG. 4 is a view illustrating the principle for manufacturing the second hologram 6. As shown in the drawing, the second hologram 6 is a reflective hologram manufactured such that a condensed spherical wave $W_3$ as the reference beam is condensed at a beam condensing point $P_3$ so that an angle of incidence of the condensed spherical wave $W_3$ to a hologram plate 6' is set as $\theta$, a condensed spherical wave $W_4$ as the object beam is condensed at a beam condensing point $P_4$ so that an angle of incidence of the condensed spherical wave $W_4$ to the hologram plate 6' is set as $\theta$, and a distance $I_3$ from the condensing point $P_3$ to the hologram plate 6' is equal to the distance $L_3$ of FIG. 2, and also the distance $I_4$ from the hologram 6' to the condensing point $P_4$ is equal to the distance $L_4$ as shown in FIG. 2.

Here, the first and second holograms 3 and 6 are, as shown in FIG. 2, so arranged that they are inclined to the horizontal line at the angle of inclination $\theta$. Also, the range of the angle of inclination $\theta$ is such that at its minimum, the vertical axis of the first hologram 3 does not cross the uppermost point A of the CRT 2 as shown in FIGS. 1 and 2, and the maximum value thereof does not exceed 45°.

Turning again to FIG. 2, the image 4 at the CRT 2 is accordingly first produced by said first hologram 3 in order to be a first produced image 4a produced at a position in a distance $L_2+L_3$ from the center portion of the first hologram 3.

The CRT 2 generates the image 4 displaying data outputted from the CPU and radiates an electromagnetic beam of the image 4 to the first hologram 3 arranged as inclined to the optical path of the CRT 2 at the angle of inclination $\theta$ so that a distortion occurs in the first produced image 4a.

Thereafter, the first projected image 4a is second projected by means of the second hologram 6 in order to be a second projected image 4b, said image 4b projected on the magnifying screen 5. At this time, the second hologram 6 is located in order to face with the first hologram 3 in parallelism as described above. Therefore, the first image 4a is inclined to the optical path of the second hologram 6 at the angle of inclination $\theta$ so that the distortion of the first projected image 4a is compensated.

In accordance with the above manufactured method for the holograms, data outputted from the CPU is converted into the image by means of the small CRT 2 and last projected on the magnifying screen 5 by way of the holograms 3 and 6.

At this time, the magnification "m" of the image projected on the screen 5 is given by the following relationship:

$$m = \underbrace{\left[\frac{L_2+L_3}{L_1}\right]}_{①} \times \underbrace{\left[\frac{L_4}{L_3}\right]}_{②} = m_1 \times m_2$$

Therefore, the magnitude "Sm" of the image 4b projected on the screen 5 is equal to the value of the magnitude "Cm" of the image 4 at the CRT 2 multiplied by the magnification "m", that is $Sm = Cm \times m$.

In the above relationship, expression 1 denotes the magnification "$m_1$" by the first hologram 3 and expression 2 denotes the magnification "$m_2$" by the second hologram 6. Also, the magnification "$m_1$" has to be equal to the magnification $m_2$ in order to efficiently compensate the distortion of the projected image.

For example, a 14" displayer provided with a 5" CRT can be designed only by calculating the distance $L_1$ from the CRT to the first hologram 3 and the distance $L_4$ from the second hologram 6 to the screen 5 depending on the desired size of the CRT display.

In other words, the magnification "m" of the above displayer for magnifying 5" magnitude into 14" magnitude is 2.8, also the magnifications $m_1$ and $m_2$ are equal to each other as described above. Therefore, the magnifications $m_1$ and $m_2$ will be calculated by $\sqrt{m}$, that is $\sqrt{2.8} \simeq 1.67$. Also, if the distances $L_1$ and $L_4$ are set as 200 mm and 300 mm, respectively, the distance $L_3$ from the second hologram 6 to the first projected image 4a will be calculated by the following expression:

$m_2 = L_4/L_3$, therefore $L_3 = L_4/m_2$

In accordance, the distance $L_3 = 300$ mm/$1.67 \simeq 179.6$ mm.

In the same manner, the distance $L_2$ from the first hologram 3 to the second hologram 6 is calculated by the following expression:

$m_1 = (L_2+L_3)/L_1$

Therefore, the distance $L_2 = (m_1 \times L_1) - L_3 = (1.67 \times 200) - 179.6 = 154.4$ mm.

Accordingly, if the distances $L_1$ and $L_4$ of the 14" displayer provided with the 5" CRT are set as 200 mm and 300 mm, respectively, another distances $L_3$ and $L_2$ of the displayer are set as about 179.6 mm and about 154.4 mm, respectively.

Also, the harmful electromagnetic waves generated from the CRT 2 are prevented from affecting the operator by means of the holograms 3 and 6, thereby protecting the operator from the harmful electromagnetic waves.

As described above, the present invention provides the displayer which is provided with a small CRT and holograms therein in order to project the image from the CRT on the magnifying screen by virtue of the reflection of the holograms so that it has advantages in that the harmful electromagnetic waves generated from the CRT does not affect the operator by virtue of the holograms, and a screen of a desired large size is obtained at lower cost.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A displayer with holograms comprising:
   a CRT disposed in a computer main body for generating an image;
   a pair of holograms for projecting said image to a screen; and
   a screen for displaying thereon said image projected by said holograms;
   said holograms comprising a pair of holograms, a first hologram arranged inclined to a horizontal line associated with said CRT in order to first project said image from said CRT, and a second hologram arranged facing said first hologram and spaced apart therefrom in order to further project said image, which was first projected by said first hologram, on said screen and to compensate distortions of said image which was first projected;
   wherein said first hologram is a reflective type hologram manufactured such that a spherical wave $W_1$ as a reference beam is radiated from a spherical wave scanning point $P_1$ to the center point of a hologram plate at an angle of incidence $\theta$, a condensed spherical wave $W_2$ as an object beam is condensed at a beam condensing point $P_2$ so that an angle of incidence of said condensed spherical wave $W_2$ to said hologram plate is set as $\theta$, a distance $l_1$ from said spherical wave scanning point $P_1$ to said hologram plate is equal to $L_1$, and also a distance $l_2$ from said hologram plate to said beam condensing point $P_2$ is equal to $L_2 + L_3$;
   wherein,
   $L_1$ = a distance from said CRT to said first hologram,
   $L_2$ = a distance between said first and second holograms,
   $L_3$ = a distance from said second hologram to an image first produced by said first hologram.

2. A displayer according to claim 1, wherein said angle of incidence $\theta$ is greater than an angle defined by the intersection of an upper edge of said CRT and an axis of the CRT and is less than 45°.

3. A displayer with holograms comprising:
   a CRT disposed in a computer main body for generating an image;
   a pair of holograms for projecting said image to a screen; and
   a screen for displaying thereon said image projected by said holograms;
   said holograms comprising a pair of holograms, a first hologram arranged inclined to a horizontal line associated with said CRT in order to first project said image from said CRT, and a second hologram arranged facing said first hologram and spaced apart therefrom in order to further project said image, which was first projected by said first hologram, on said screen and to compensate distortions of said image which was first projected;
   wherein said second hologram is a reflective type hologram manufactured such that a condensed spherical wave $W_3$ as the reference beam is condensed at a beam condensing point $P_3$ so that an angle of incidence of said condensed spherical wave $W_3$ to a hologram plate is set as $\theta$, a condensed spherical wave $W_4$ as the object beam is condensed at a beam condensing point $P_4$ so that an angle of incidence of said condensed spherical wave $W_4$ to said hologram plate is set as $\theta$, and a distance $l_3$ from said beam condensing point $P_3$ to said hologram plate is equal to $L_3$, and also a distance $l_4$ from said hologram plate to said beam condensing point $P_4$ is equal to $L_4$;
   wherein,
   $L_3$ = a distance from said second hologram to an image first projected by said first hologram; and
   $L_4$ = a distance from said second hologram to an image second projected by said second hologram.

4. A displayer with holograms comprising:
   a CRT disposed in a computer main body for generating an image;
   a pair of holograms for projecting said image to a screen; and
   a screen for displaying thereon said image projected by said holograms;
   said holograms comprising a pair of holograms, a first hologram arranged inclined to a horizontal line associated with said CRT in order to first project said image from said CRT, and a second hologram arranged facing said first hologram and spaced apart therefrom in order to further project said image, which was first projected by said first hologram, on said screen and to compensate distortions of said image which was first projected;
   wherein said displayer has a magnification "m" of said image projected on said screen with respect to said image generated by said CRT which is given by the following relationships:

$$m = \left[\frac{L_2 + L_3}{L_1}\right] \times \left[\frac{L_4}{L_3}\right] = m_1 \times m_2, \text{ and}$$

$m_1 = m_2$ wherein,
$m_1$ = a magnification by said first hologram, and
$m_2$ = a magnification by said second hologram,

* * * * *